US006709541B2

(12) United States Patent
Slone

(10) Patent No.: US 6,709,541 B2
(45) Date of Patent: Mar. 23, 2004

(54) APPARATUS AND METHOD FOR THE TRANSFER OF SIGN GRAPHICS

(76) Inventor: Brian J. Slone, 11048 Harrison Stewart La., Hammond, LA (US) 70401

( * ) Notice: Subject to any disclaimer, the term of this patent is extended or adjusted under 35 U.S.C. 154(b) by 0 days.

(21) Appl. No.: 10/180,538

(22) Filed: Jun. 27, 2002

(65) Prior Publication Data

US 2003/0000633 A1 Jan. 2, 2003

Related U.S. Application Data

(60) Provisional application No. 60/301,839, filed on Jul. 2, 2001.

(51) Int. Cl.7 ............................ B44C 1/17; B44C 1/18; B44C 1/24; B32B 31/20; B41M 3/12

(52) U.S. Cl. ....................... 156/230; 156/235; 156/238; 156/240; 156/247; 156/289; 156/540; 156/541; 156/574; 156/576; 156/582

(58) Field of Search ................................ 156/230, 235, 156/238, 240, 241, 247, 277, 289, 540, 541, 543, 574, 576, 577, 580, 582

(56) References Cited

U.S. PATENT DOCUMENTS 3,323,454 A * 6/1967 McFarland .................. 101/269
4,183,143 A * 1/1980 Root ......................... 33/184.5
5,352,314 A * 10/1994 Coplan ....................... 156/234
5,795,435 A * 8/1998 Waters, Jr. .................. 156/577
6,102,096 A * 8/2000 Johansson et al. .......... 156/353

* cited by examiner

*Primary Examiner*—J. A. Lorengo
(74) *Attorney, Agent, or Firm*—Jacobson Holman PLLC

(57) ABSTRACT

A method and device for applying a graphic from a carrier sheet to a receiving substrate. A press roll, mateingly aligned to a support surface, is made to traverse the support surface in a reciprocating manner while applying controlled pressure. A flexible web is attached and held stationary at one end of the support surface, wrapped around the press roll, and fixed to a tensioning device that allows movement of the web under tension. The web is adhesively coated on the side opposite the press roll. When pulled across the work surface by the press roll, the adhesive face of the web comes in contact with the graphic and is removed from the carrier sheet. The web is reversed and the graphic is peeled away from the work surface and the carrier sheet by the tensioning device. The carrier sheet is removed, replaced by the receiving substrate, and the cycle is repeated applying the graphic to the receiving substrate.

13 Claims, 8 Drawing Sheets

APPARATUS AND METHOD FOR THE TRANSFER OF SIGN GRAPHICS

This is a complete application claiming benefit of provisional application Ser. No. 60/301,839, filed Jul. 2, 2001.

FIELD OF INVENTION

This invention relates to a method and apparatus for transferring a predetermined graphic image, cut from a thin flexible layer of sign making material and adhesively attached to a carrier sheet, onto the supporting surface of a sign or graphic display.

DESCRIPTION OF PRIOR ART

Well known in to the art, a common method for the production of signs, and other graphic displays, employs the use of a sign making material. This material is a two ply laminated web comprised of a first ply of a thin flexible layer or sheet of vinyl, and a second ply of a base layer, carrier sheet or release paper, with the two layers being separated by a thin layer of permanently tacky or pressure sensitive adhesive. The carrier sheet, or release paper, is specially coated to prevent strong adhesion of the vinyl. Vinyl is commonly available in rolls of varying width and length. Although an image may be cut by hand or die-cut, most are cut by computer controlled plotters or cutters. The cutter is designed to precisely cut the outline of the graphic image or images completely through the first ply and stop short of cutting through the second ply. When cutting is complete, the area of the first ply surrounding the graphic is removed or weeded away, leaving the desired graphic attached to the second ply.

The graphic image is then ready for transfer to the surface where it will be permanently displayed. Most often the transfer of the graphic image to the display surface or substrate employs the use of a transparent or semi-transparent tape. The tape may be paper, plastic, or other sheet material which is coated with an adhesive on it's underside. The adhesive is designed to fracture at a higher stress than the bond between the first ply and the second ply of the sign making material and at a lower stress than the bond between the first ply of the sign making material and the substrate.

Transfer tape is commonly available in rolls of varying width and length. A piece of tape sufficient in size to cover the entire area of the first ply containing graphics is employed to transfer all of the graphic image at once. In this manner the various parts of the graphic image will retain their position relative to each other during transfer.

The most common method for transferring the graphics is a manual process. Typically vinyl and transfer tape are stocked in complementary widths dictated by the capacity of the cutter. Work tables are generally arranged with, at one end, a support for the roll of transfer tape that will allow the material to be pulled or spooled from the roll in a plane above and parallel to the work surface. The adhesive face of the transfer tape is oriented to contact the table surface.

The weeded graphic is placed on the table with the finished face of the vinyl facing up. It is positioned to be directly under the transfer tape as the transfer tape is spooled from the roll. The transfer tape is spooled from the roll and is not allowed to touch the weeded graphic until the transfer tape is of sufficient length to completely cover the graphic. The tape is then laid down incrementally to insure smooth application. Once the transfer tape is in position it is cut from the roll and pressed firmly down on the graphic with a hand held roller or squeegee to insure adhesion. The lamination of release paper, vinyl and transfer tape is then oriented or registered on the substrate relative to it's permanent position. One edge of the lamination is temporarily taped to the substrate to maintain registration and acts as a hinge which allows the lamination to flip over exposing the back of the release paper. The release paper, having a lesser bond with the vinyl than the vinyl with the transfer tape is peeled away leaving the vinyl attached to the transfer tape and the adhesive face of both exposed. Supporting the remaining lamination so that it can be laid down evenly, the lamination is flipped back bringing the adhesive face of the vinyl and transfer tape in contact with the substrate. Once the lamination is in position it is pressed firmly down on the graphic with a hand held roller or squeegee to insure adhesion. The transfer tape having a lesser bond with the vinyl than the vinyl with the substrate is peeled away leaving the vinyl graphic adhered to the substrate. The transfer tape is discarded. This process is repeated for each individual color used to produce the final sign or display.

The difficulties associated with the above mentioned process are well known in the industry:

a) The transfer of vinyl graphics is a multi-step process requiring the skilled manipulation of various flexible sheet goods having exposed adhesive surfaces. The material must be maintained in a planer orientation, contact must be controlled, and placement somewhat precise. In instances where the graphic to be applied is relatively large, more than one person may be required to control the material. Improper manipulation can result in misalignment, permanent wrinkling of the finished product, air trapped between laminations causing bubbles, or complete deformation of the graphic rendering the product unusable.

b) Because the transfer tape is constructed of a flexible sheet material with an adhesive face, it is difficult to remove after application in a reusable manner. Although the adhesive properties may still be intact, the labor involved in maintaining the tape in a planer, unwrinkled, and clean condition is generally not worth the effort. Therefore the expense of application tape is incurred with each transfer. Additionally there is the expense of handling and proper disposal of waste, consumption of nonrenewable resources, and increased volume to area landfills.

c) Proper orientation of the graphic on the substrate is generally visual as this is the nature of the product. A trained eye is required to efficiently place graphics without the aid of measuring instruments, whereby use of such instruments, increase the time consumed in producing the finished product. When positioning the lamination of release paper, graphic, and transfer tape on a substrate, the opaque release paper covers a substantial portion if not all of the substrate limiting visual reference. When additional layers of vinyl must be applied to achieve a multicolor product, the opaque release paper impedes visual reference to the previously applied layers.

U.S. Pat. No. 5,352,314 (1994) to Coplan includes an open rectangular frame covered on one side with application tape used to transfer the graphic. The adhesive face of the tape is positioned toward the frame, stretched tight and clipped in place on each attached end. The frame is laid over the weeded graphic with the adhesive face of the application tape suspended just above the lamination. The clear film allows visual alignment and when in position the film is pressed down onto the graphic with a hand held roller or squeegee. The frame is then lifted to access the lamination now attached to the application tape. The release paper is removed from the graphic leaving the graphic attached to the application tape, with the adhesive side of both the graphic and application tape exposed. The frame is then positioned over the substrate, aligned, and pressed down onto the substrate with a hand held roller or squeegee. The frame is lifted to access the lamination now attached to the application tape. The substrate with the graphic attached is removed from the application tape.

Although obvious advantages exist with U.S. Pat. No. 5,352,314 (1994) to Coplan, they are limited to the planer control of the application tape, reuse of the application tape, and orientation of the graphic. The invention does not automate or substantially reduce the number of steps required by the process previously described. Additionally it is difficult to separate the substrate and applied graphic from the application tape after the transfer is complete. With both being held substantially planer, the finished product must be pried from the tape. This stretches the tape and requires constant re-tensioning.

A method for the planer control of the transfer tape and graphic is demonstrated in U.S. Pat. No. 5,795,435 (1998) to Waters.

U.S. Pat. No. 6,102,096 (2000) to Johansson demonstrates a method for the planer control of the transfer tape and graphic and a method of adhering same.

SUMMARY OF THE INVENTION

The invention resides in a machine, and method of use for the transfer of a substantially planer article, shape, graphic image, or plurality thereof, from a carrier sheet, to which it is adhesively attached, to another means of support. The invention is well suited for use in the graphic sign industry for the application of vinyl sign making materials, but it's use is not necessarily restricted to this application as almost any flexible thin gauge material that can be arranged and adhesively attached to a receiving surface, may be transferred.

The device according to the invention is characterized in that a roller attached to a means of traverse is moveable in a reciprocating manner across a substantially planer and unyielding support surface. The roller, substantially spanning the width of the support surface, is made to contact the support surface with pressure and controlled in a manner as to lay down a transfer web.

The web is constructed of a flexible sheet material with an adhesive coating applied to one side. The base sheet of the transfer web is of sufficient strength that it may be held in tension when laid down and peeled up without excessive deformation. The web is held stationary at one end of the traverse and passes in front of and around the roller. The opposite end of the web is free to be pulled with the roller while held in tension and is of sufficient length to be laid down the entire length of the traverse while remaining attached to the tensioning device.

The method according to the invention includes the reciprocating motion of the roller over the length of the traverse, laying down and peeling up the transfer web. The article to be transferred is placed on the support surface relative to it's final position on the receiving surface. The carrier sheet is placed in contact with the support surface. The roller is then made to traverse the length of the support surface, sandwiching the article and the carrier sheet between the adhesive face of the transfer web and the support surface. The adhesive on the transfer web is of such composition that with sufficient pressure from the roller it will bond to the article at a higher strength to fracture than the bond between the article and the carrier. With the reverse of the roller, the transfer web is pulled back by the tension device and due to the differential bonding, the article is lifted away from the carrier sheet. The position of the article is maintained relative to both its original alignment on the carrier sheet and placement on the support surface. The carrier sheet is removed and replaced with the receiving substrate having it's finished face opposite the support surface and aligned relative to the previous placement of the article. The roller is then made to traverse the length of the support surface, sandwiching the article and the receiving substrate between the adhesive face of the transfer web and the support surface. The adhesive on the transfer web is of such composition that with sufficient pressure from the roller the article will bond to the receiving substrate at a higher strength to fracture than the bond between the article and the transfer web. With the reverse of the roller, the transfer web is pulled back by the tension device and due to the differential bonding the article remains attached to the receiving substrate.

Objects and Advantages

The invention serves the need for one device that will separate the graphic from the carrier and reapply it to the substrate. The advantage over prior art is as follows:

a) The number of steps required to transfer graphic images by conventional means are substantially reduced, simplifying the process and saving time. Positioning and bonding of the transfer medium is controlled by the invention and accomplished simultaneously, nearly eliminating wrinkles and bubbles.

b) The transfer medium is maintained in a controlled manner by the invention eliminating manual handling during the transfer process. This prevents deformation of the base sheet and allows the transfer medium to be used a plurality of times based on it's ability to properly adhere.

c) The transfer medium is controlled in a manner such that it's position relative to the support surface remains constant. Thereby a graphic stripped from the release paper will be applied in the same position relative to the support surface. This provides a means to position the graphic, absent the receiving substrate. The support surface may then be made translucent and backlit, reducing the opacity of the release paper. With alignment markings in the support surface being visible, position of the receiving substrate may be assumed. Registration marks placed on the graphic at the time of design and cutting provide alignment to the grid of the support surface.

DETAILED DESCRIPTION OF THE PREFERRED EMBODIMENTS

Figure 1A:
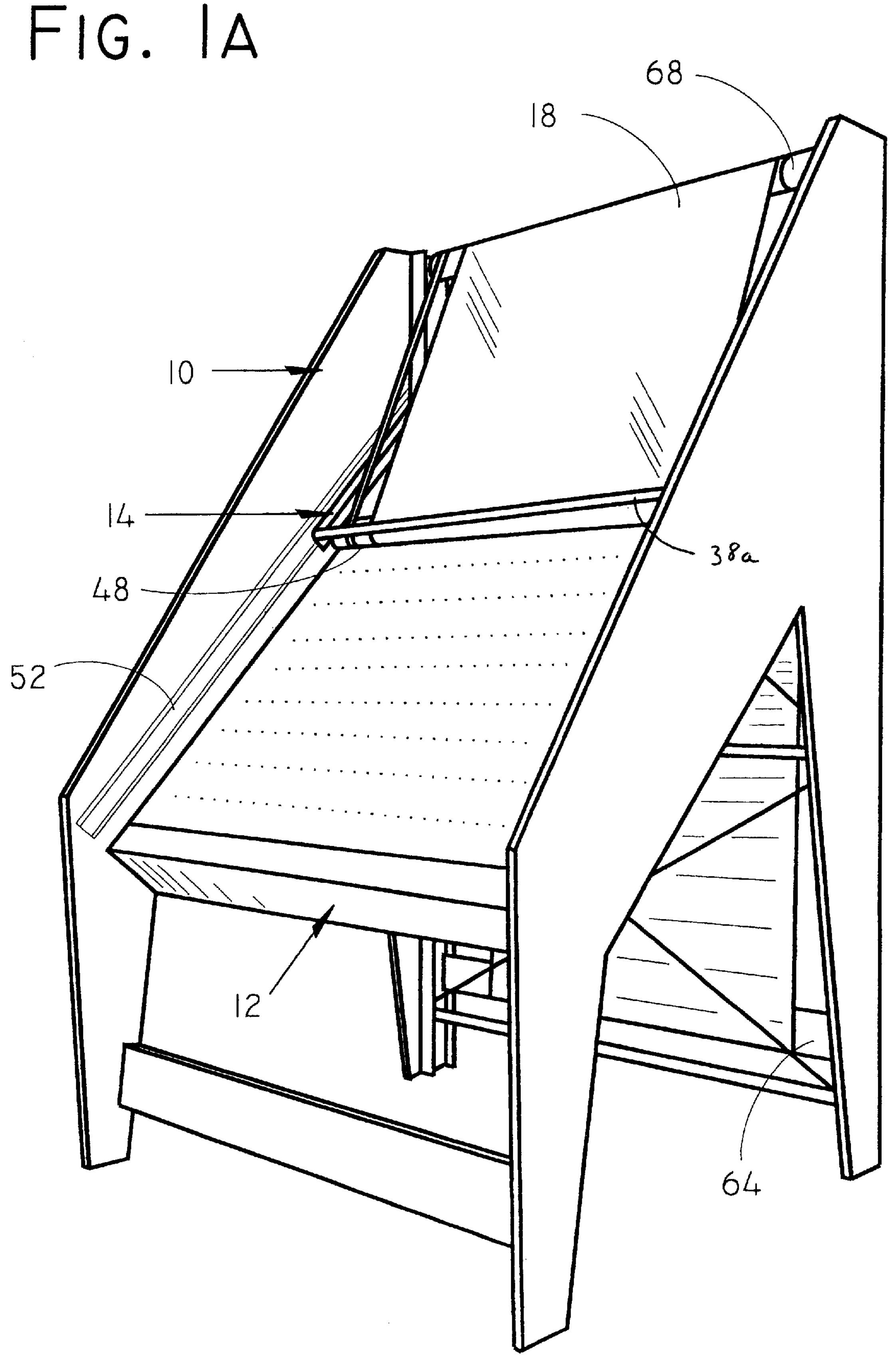
FIGS. 1A & 1B are perspective views of the front and right side of the apparatus before and after extension of the transfer web.

As shown in FIGS. 1A, 1B, 2A and 2B a frame 10 supports the working components of the invention with the laminating table 12 at an elevation readily accessible to the operator. The frame consists of a pair of parallel support panels 20 separated by, and on each side of, the laminating table 12. The laminating table is supported by the plenum frame 26, shown in FIG. 5, and serves a dual purpose, one of which provides structural support and rigidly connects the side support panels 20. The rear channel support frame 22, shown in FIGS. 2A and 2B, serves a dual purpose, one of which further connects the side support panels. Frame 22 is constructed of two vertical members separated by a series of horizontal stays and diagonal tensioning members. Additional bracing may be present as required.

Figure 3:
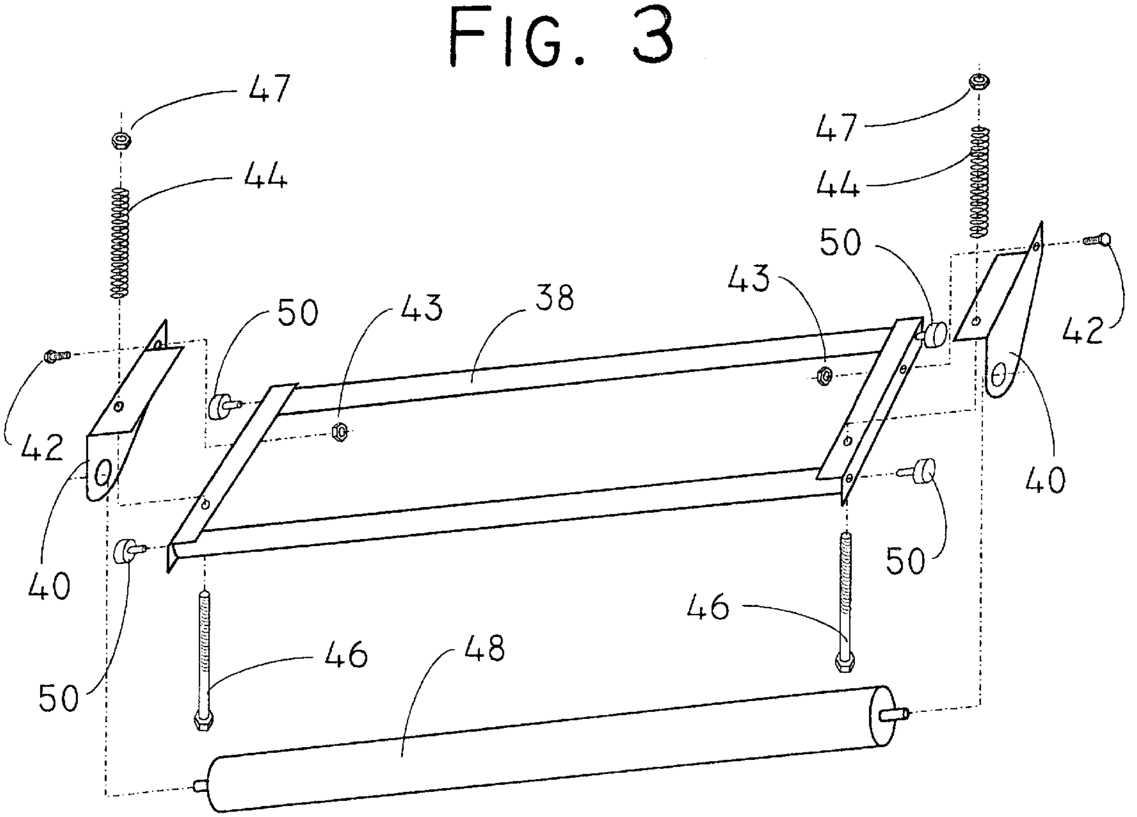
FIG. 3 is a perspective view of the pressure roller and exploded view of the carriage assembly.

FIG. 3 shows an exploded view of the carriage assembly 14, which supports the pressure roller 48, and provides the means of traversing the laminating table 12. The carriage frame 38 is of open rectangular construction with the frontmost portion of the frame serving as a handle or pull bar 38*a* for actuating the traverse. The roller is designed to freely rotate about a center shaft by means of a suitable bearing or bushing. The center shaft of the pressure roller is at each end connected to the pressure plate 40 which extends below the carriage frame 38 to allow vertical movement of the roller 48 and maintain even pressure against the laminating surface 24, shown in FIG. 5.

The pressure plate 40 is at one end connected to the carriage assembly 14 by the pivot bolt 42 and lock nut 43. The pivot bolt and nut secure the pressure plate to the frame 38 and allow it to rotate about the bolt. The pressure adjustment bolt 46 connects the pressure plate 40 at the end opposite the pivot bolt. The pressure adjustment bolt passes through a hole in the carriage frame 38 and again through a hole in the pressure plate 40. A compression spring 44 is placed on the bolt and the assembly is captured with a nut 47. In this manner the pressure roller 48 is allowed to move vertically while the vertical distance between the carriage frame 38 and the laminating surface 24 is maintained. The pressure at which the roller contacts the laminating surface is controlled by restricting or pre-compressing the spring, with the tightening more or less of the pressure adjustment bolt and nut. A cam roller 50 is located on each of the four corners of the carriage frame 38. The cam rollers are captured by the roller track 52, shown in FIG. 1A, which guides the carriage the length of the traverse.

Figure 5:
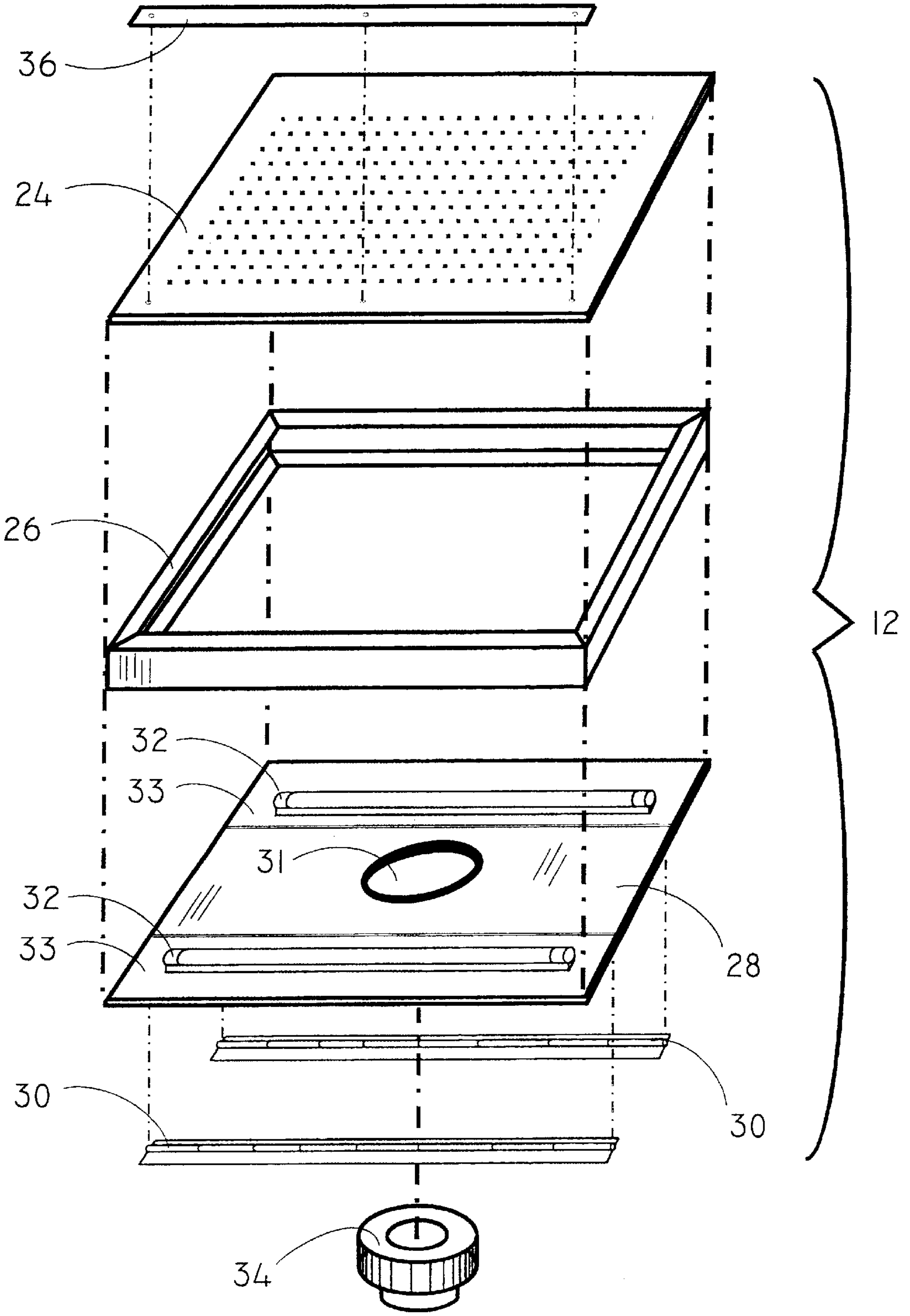
FIG. 5 is an exploded isometric view of the laminating table.
Figure 6C:
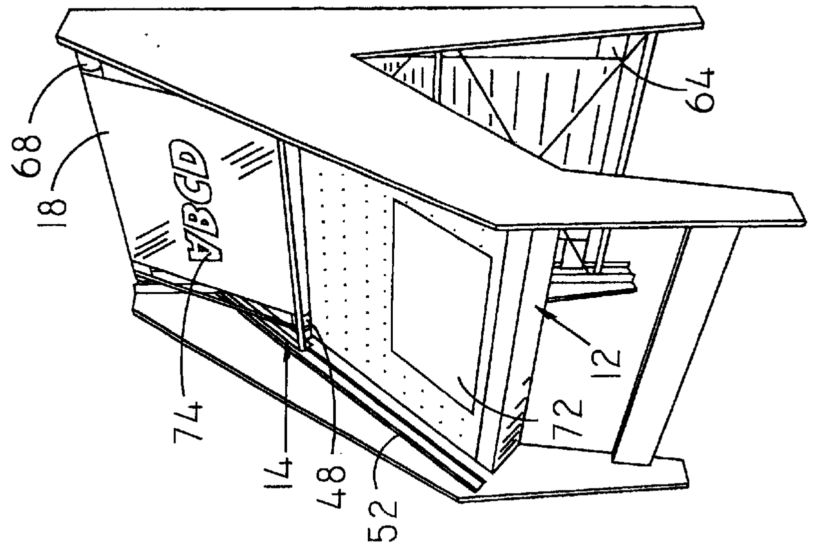
FIGS. 6A–6F are environmental perspective views of the operation of the apparatus.
Figure 6B:
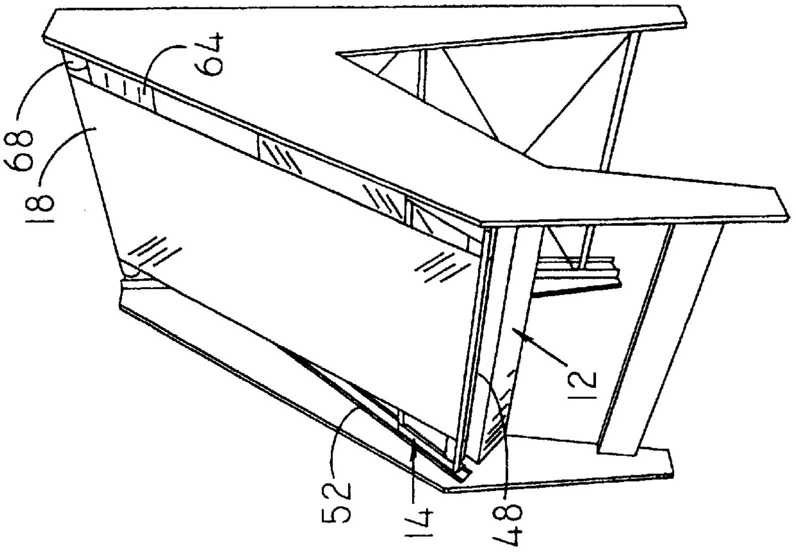

FIG. 5 shows an exploded view of the laminating table assembly 12. In addition to providing structural support as described previously, the plenum frame 26 separates the laminating surface 24 and the bottom closure 28, creating a cavity. This cavity provides a plenum in which the free air is evacuated by the vacuum blower 34. The laminating surface is constructed of a rigid and planer material with a plurality of evenly spaced perforations. Air is drawn through the perforations in the laminating surface to create an even suction on the laminating surface. Materials placed on the laminating surface are held by the suction that is formed. The laminating surface may be made with a non-stick surface, for example, a layer of low friction TEFLON or silicon material. The material fence 36 is mounted on the lower edge of the table providing a fixed reference for the bottom edge of the receiving substrate 76, shown in FIG. 6D, and further maintains the position of the receiving substrate.

The laminating surface 24 is constructed of a translucent material which is illuminated from within the cavity of the laminating table by electrical lights 32. The laminating surface is marked with graduated lines to provide reference for alignment of the product. The perforations used for vacuum are made in a regular and evenly spaced pattern which produces a grid that may also be used for alignment of the product. When illuminated these graduations are more visible through an opaque material. The lights are mounted on access panels 33 which are connected to the bottom closure by a hinge 30 to allow access to the lights for maintenance and provide closure of the plenum.

Figure 4:
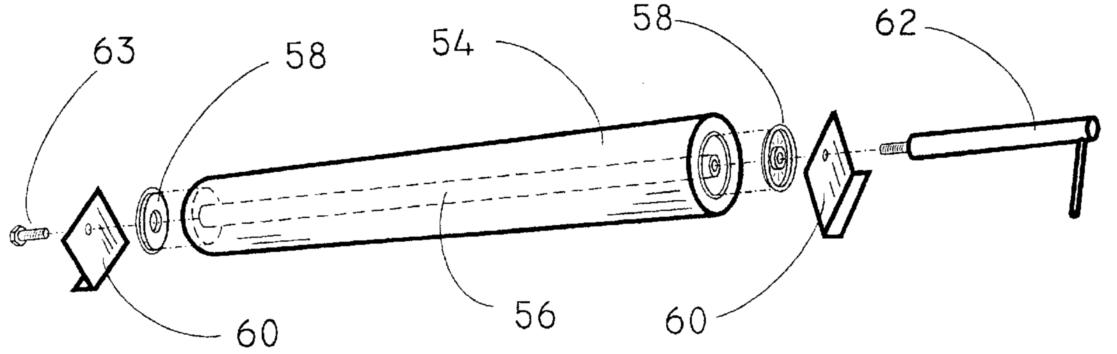
FIG. 4 is an exploded two dimensional view of the film dispenser.

FIG. 4. is an exploded view of components of the film dispensing assembly 16. A film roll 54 or transfer tape is commercially available wound about a three inch, plus or minus, core. The core is adapted to fit a core shaft 56 by the core plug 58 which is substantially a bushing that allows the film roll to rotate axially about the core shaft. A squeeze plate 60 is located on each end of the film roll and matingly adapted to form jaws which hold the film roll stationary when compressed against the film roll ends. The squeeze plate is mechanically fastened to the plenum frame 26, shown in FIG. 5, and dimensionally adapted to allow the film roll to be placed between the mated pair. The core shaft is slightly shorter than the finished length of the film roll with each end adapted to receive a threaded connector. At one end a bolt 63 is placed through a hole in the squeeze plate and joined to the core shaft. At the opposite end a locking handle 62 is placed through a hole in the squeeze plate and joined to the core shaft. The locking handle extends through the side panel 20, shown in FIGS. 2A and 2B, to the exterior of the press for easy access.

A transfer web 18, FIGS. 1A, 1B, 2A and 2B, emanates from the film roll to pass in front of the pressure roll 48, FIG. 4. The flexible web is oriented such that the adhesive face will contact the laminating surface 24 and its width is perpendicular to traverse. The free end of the web continues onto and around a idler roller 68, FIGS. 2A and 2B. The idler roll allows for a change of direction in the film path and is designed to freely rotate about a center shaft by means of a suitable bearing or bushing. The center shaft of the idler roller is at each end connected to the rear channel support frame 22 and is horizontally adjustable to control the alignment of the web. The web continues to an attachment point on the tension bar 64, which is made to travel vertically and maintain tension on the web (as shown comparing FIG. 2A and FIG. 2B). The tension bar is of sufficient weight to employ the force of gravity to maintain web tension and counter balance the weight of the carriage roll assembly 14, FIGS. 1A and 1B. The tension bar has a track affixed at each end which mates to one flange of the respective channel frame to guide the tension bar vertically in a controlled manner.

In alternative embodiments of the present invention, pressure rollers may be replaced by a squeegee. Also units of larger construction may have the laminating surface extend further horizontally and/or traverse, with the operator working from the side of the apparatus rather than in front of the apparatus. Adhesive may be applied to web by a separate mechanism to refresh tackiness to the transfer web.

Advantages

A number of advantages achieved by the present invention become apparent.

(a) Accomplishes both application of the transfer film and transfer of the graphic with one device.

(b) Mechanically supports and tensions the adhesive web eliminating human manipulation of flexible materials while adhesives are exposed.

(c) Eliminates the need for more than one person to manipulate materials with exposed adhesive where large graphic panels are applied.

(d) Transfer film is applied with even and constant pressure eliminating the need to manually squeegee or roll the lamination, providing more consistent adhesion.

(e) Mechanical placement of the adhesive web under pressure eliminates air bubbles.

(f) Mechanical placement of the adhesive web under pressure eliminates wrinkles.

(g) Maintains adhesive web in a reusable condition reducing waste.

(h) Consistent placement of the adhesive web eliminates manipulation of the web to register the graphic.

(i) Allows for precise placement of the graphic without exposing the adhesive.

(j) Visible grid aids in registration of graphic, reducing labor skill requirements.

Operation

The film roll 54, FIG. 4, or transfer tape, must first be prepared for loading into the film dispensing assembly 16. The core plug 58 is pressed into the open end of the film roll core, one on each end. The core shaft 56 is guided through the center hole of the core plug at one end of the roll, through the core of the film roll, and out the center hole of the core plug at the opposite end. The assembly is placed between the squeeze plates 60 with the tail or end of the tape oriented so that it will spool toward the pressure roller 48 and have the adhesive face come in contact with the laminating surface 24. The bolt 63 is passed through the hole in the squeeze plate, threaded into one end of the core shaft, and tightened sufficiently to prevent the shaft from rotating. The locking handle 62 is passed through a hole in the side panel 20, FIGS. 2A and 2B, through the hole in the squeeze plate, and threaded into the core shaft.

Figure 2A:
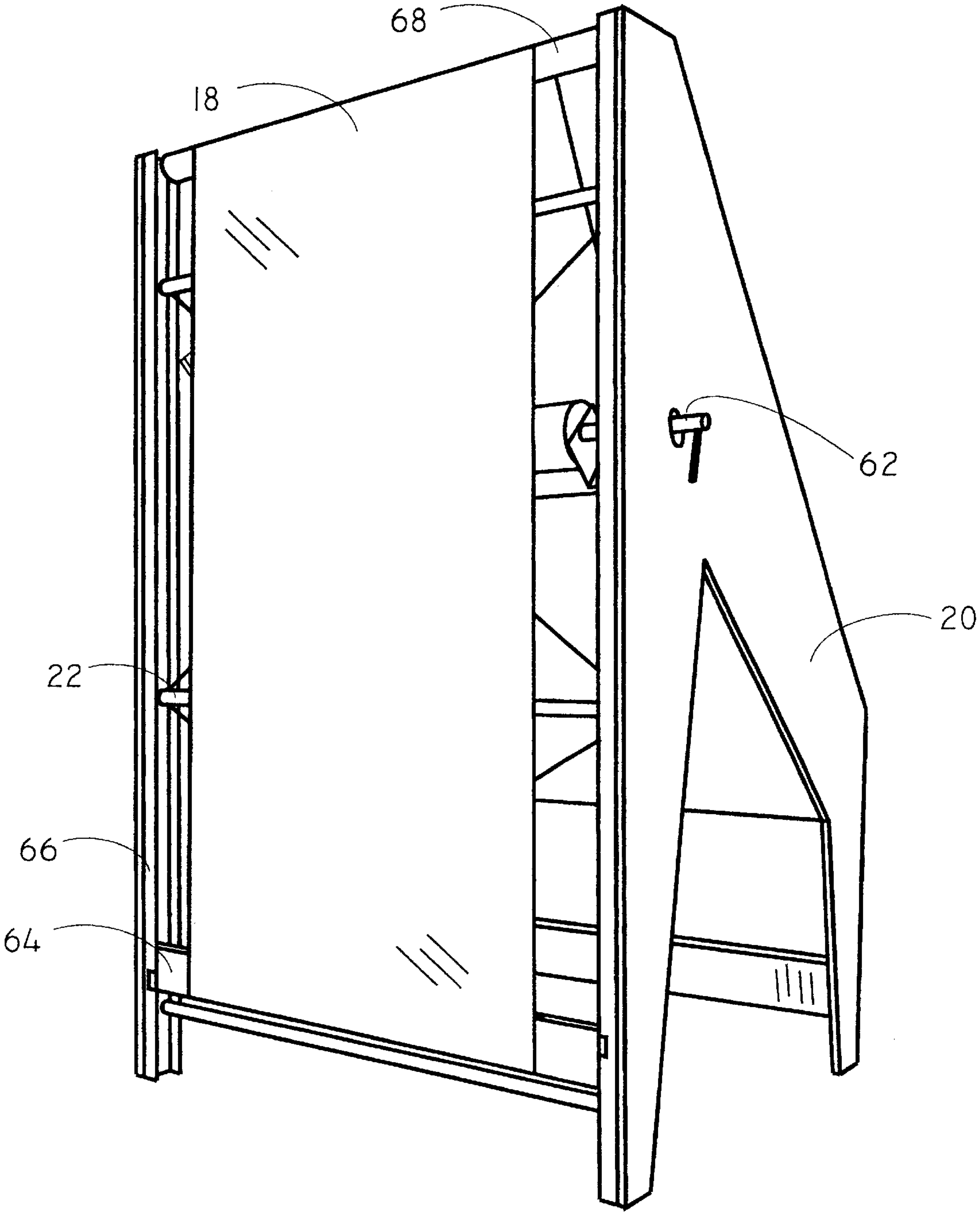
FIGS. 2A & 2B are perspective views of the rear and left side of the apparatus before and after extension of the transfer web.

The locking handle 62 is loosened to allow the film roll 54 to rotate axially around the core shaft 56 and a predetermined length of tape is spooled from the roll. The transfer web 18 from film roll 54 is threaded first in front of the pressure roller 48 with the adhesive face opposite the face of the roller. Spooling additional tape as required, the web is passed up and over the idler roll 68 and then down to the lower end of the channel frame 22 to tension bar 64 (FIG. 2A). The web is passed behind, around, then up in front and past the edge of tension bar, making a complete wrap. The tape is then adhesively secured to the bar 64 and itself with hand pressure applied to the surface of the contacting area. The film roll is rewound slightly, suspending the tension bar by the free end of the web on the bar 64. The locking handle is tightened, causing the squeeze plates to grip the film roll with sufficient pressure to hold it stationary.

Figure 1B:
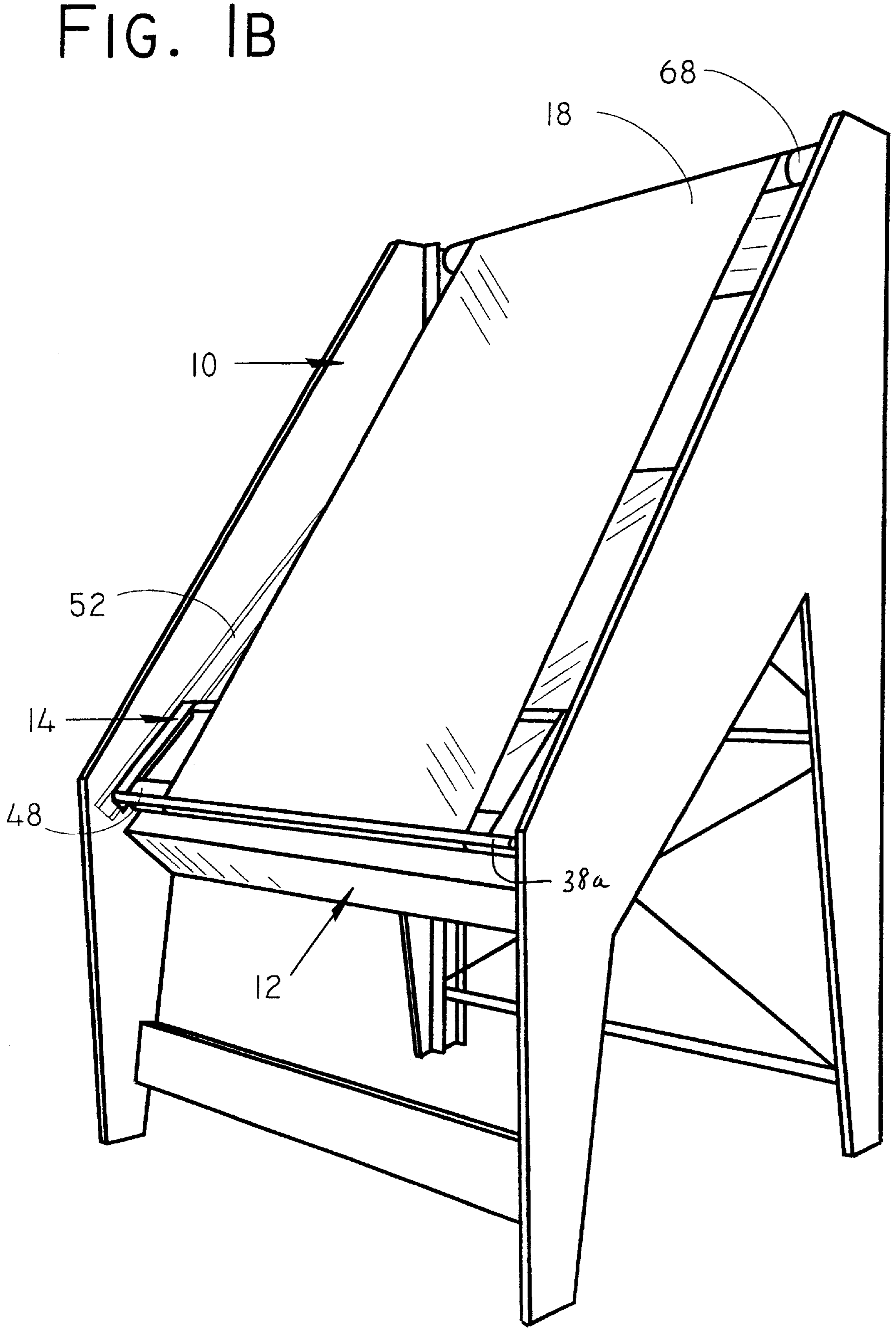
Figure 2B:
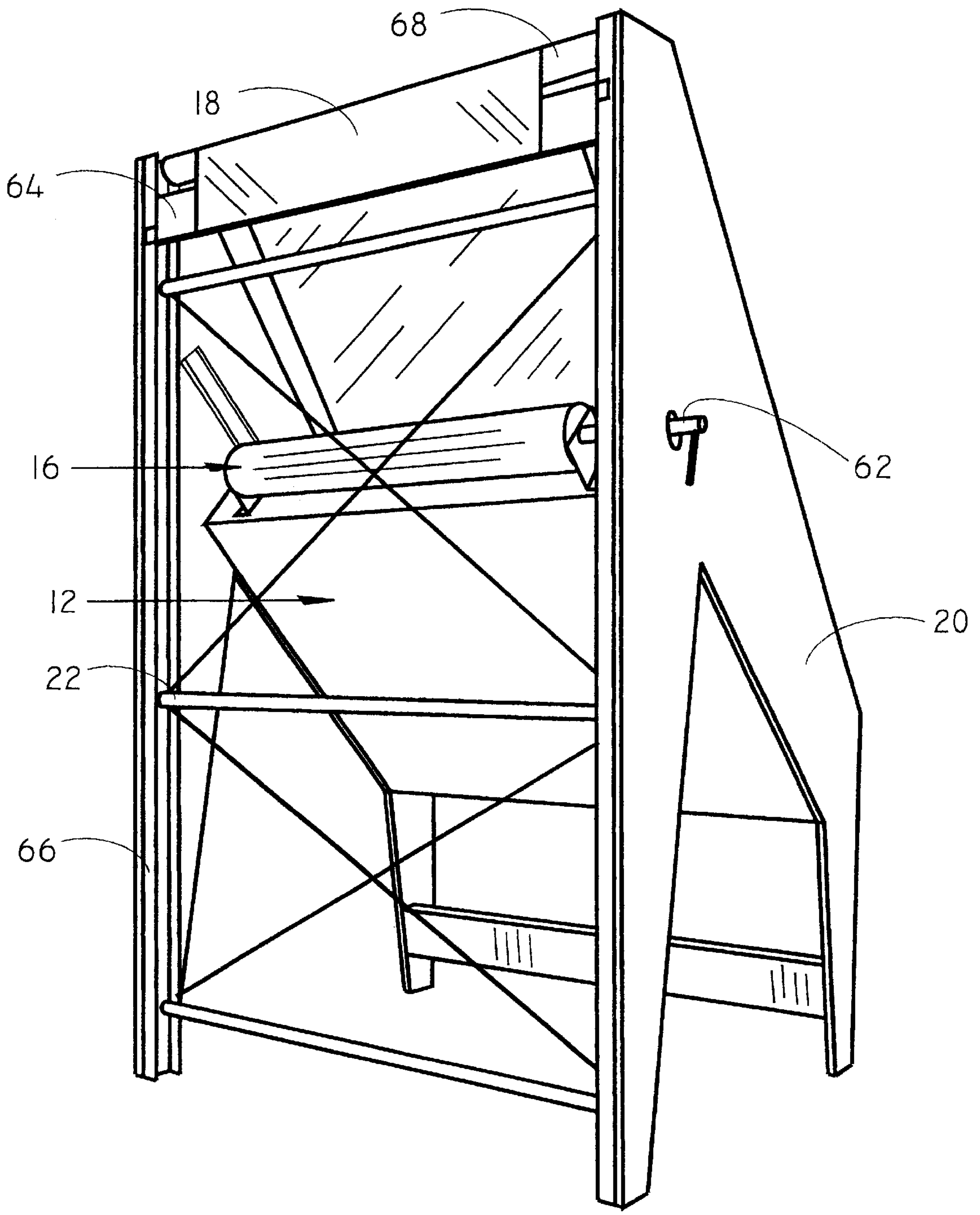

FIGS. 1A and 2A show the carriage assembly 14 in the neutral position behind the laminating table assembly 12 with the web threaded up. The tension bar 64 is at rest near the bottom of the rear channel support frame with the weight of the bar pulling against the free end of the web. The front member of the carriage serves as a handle or pull bar 38*a* which is used to actuate the press. The carriage is manually pulled downward across the laminating surface 24 toward the material fence 36 by pull bar 38*a*. As the carriage is pulled forward, the web held stationary at the film roll and feeding from the free end, is rolled out and pressed down on the laminating surface 24. FIGS. 1B & 2B show the carriage assembly completely actuated and at its end of travel. The tension bar, at its end of travel, has been pulled to the top of the channel frame near the idler roller 68 (FIG. 2B).

Electrification of the unit activates the vacuum blower 34 and the lights 32, shown in FIG. 5.

Figure 6A:
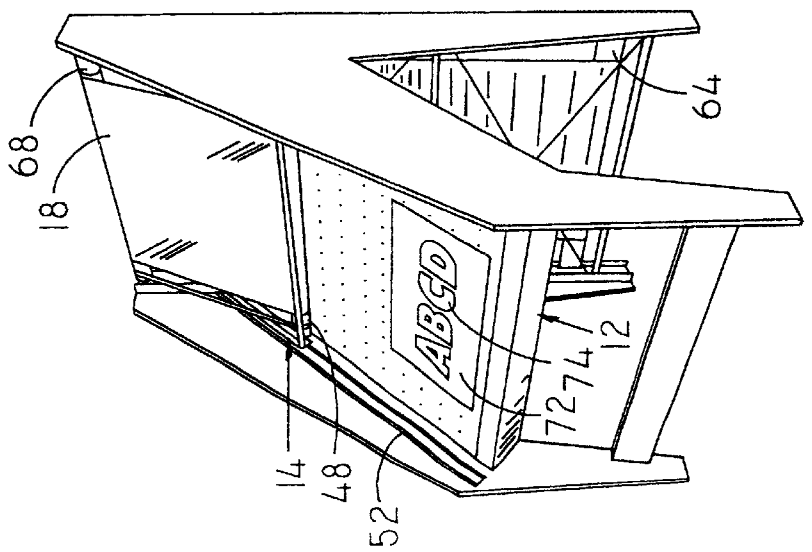

Operation of the unit begins by placing the release paper 72, with the weeded graphic 74 attached, on the laminating surface 24, as shown in FIG. 6A. The reference marks and grid produced by the vacuum perforations are used to register the graphic on the laminating surface relative its position on the receiving substrate. The carriage 14 is actuated by grasping the pull bar 38*a* and drawing it across the laminating surface 24. As the transfer web 18 is laid down, it comes in contact with the graphic, and with proper pressure is adhered thereto.

At the end of travel, FIG. 6B, the reverse is preformed pushing the carriage across the laminating surface toward the stationary end of the film. The release paper is held by vacuum, and or the operator, as the film is peeled from the laminating surface and release paper, leaving the graphic attached to the transfer web, FIG. 6C.

Alternatively the release paper may be allowed to roll up on the transfer web with the weeded graphic. With the back side of the release paper exposed to the operator, it may then be peeled away manually from the transfer web, leaving behind the weeded graphic. The release paper is discarded.

The reference marks and grid produced by the vacuum perforations are used to register the receiving substrate 76 (FIG. 6D) on the laminating surface 24 relative to the previous placement of the graphic. The carriage 14 is actuated by grasping the pull bar 38*a* and drawing the pull bar across the laminating surface. As the transfer web 18 is laid down, the weeded graphic and the transfer web come in contact with the receiving substrate 76, and with proper pressure, the graphic is adhered to the receiving substrate 76.

Figure 6F:
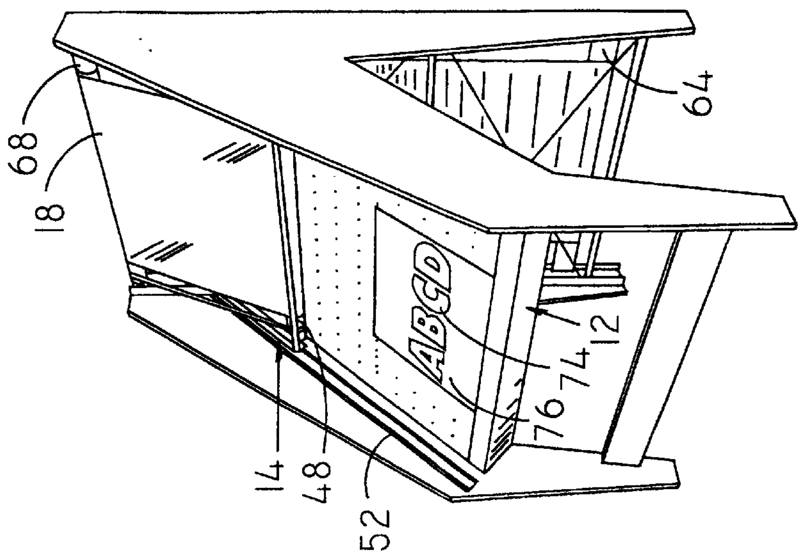
Figure 6E:
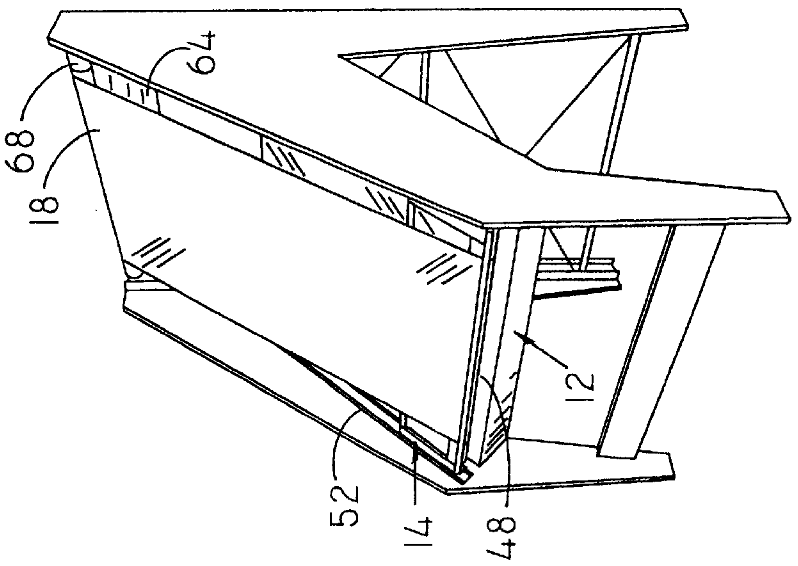
Figure 6D:
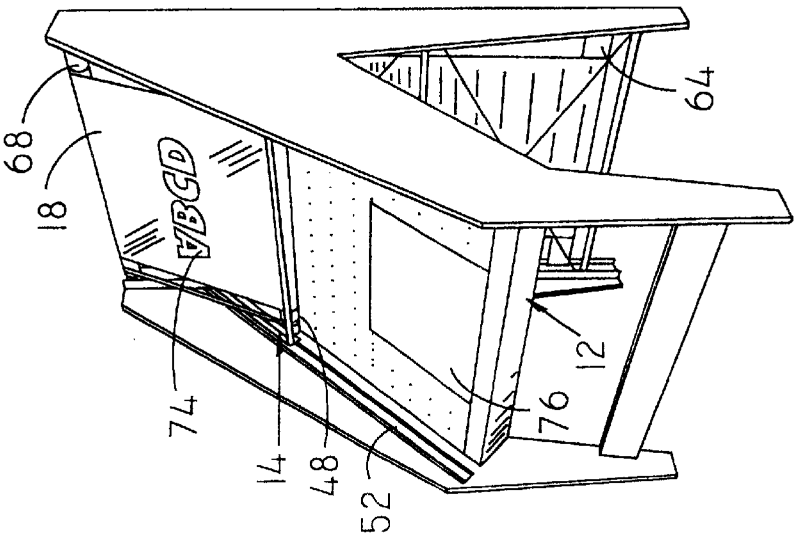

At the end of travel, FIG. 6E, the reverse is preformed pushing the carriage across the laminating surface toward the stationary end of the film. The substrate is held by vacuum, and or the operator, as the film is peeled from the laminating surface and substrate, leaving the graphic attached to the receiving substrate 76, FIG. 6*f*. Application of the graphic is complete.

The application process is repeated for each color required to produce the final display. Where the final display is larger than the graphic film being used, additional transfers may be required to complete the display, commonly referred to as paneling.

Conclusion

Accordingly, the vinyl applicator satisfies the objectives stated by simplifying the transfer process. One device preforms both the application of the transfer medium and the transfer of the finished graphic. The transfer medium is maintained in a planar configuration, controlled mechanically, and may be used repeatedly. Registration is made to a well defined visual grid on the laminating surface reducing the skill required for accurate placement. Furthermore, the applicator has the additional advantages in that

- it reduces skill level required to apply graphics;
- it eliminates bubbles and wrinkles in the finished product by applying pressure to the web as it is laid out over the graphic;
- it reduces costly waste material and handling;
- it reduces consumption of non renewable resources; and
- it reduces volume to landfills.

Although the description above contains many specificities, these should not be construed as limiting the scope of the invention but as merely providing illustrations of some of the presently preferred embodiments of this invention. For example, the applicator may be configured to accommodate larger or smaller transfers, with the laminating surface oriented angle toward or opposite the operator. Actuation of the carriage may be manual or mechanically powered. Tensioning of the web may be accomplished by mechanical means. The web may be constructed in a permanent manner with the adhesive applied at the time of transfer. The pressure roller may be replaced with a squeegee or similar blade like mechanism, etc.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A method for transfer of a flexible material with an adhesive applied to one face and temporarily attached to a carrier sheet, to a finished receiving substrate, said method comprising:

- locating the flexible material on a support surface,
- traversing the support surface with a roller,
- laying out a portion connected to a continuous roll of an adhesively coated web under pressure and tension by the roller, onto the flexible material,
- bonding the portion of the web to the flexible material,
- reversing the traverse of the support surface with the roller thereby supporting the flexible material on the portion of the web while the carrier sheet is removed and while the portion of the web is still connected to the continuous roll of web,
- locating the receiving substrate on the support surface, and
- laying the portion of the web across the receiving substrate and bonding the flexible material to the receiving substrate with the portion of the web then being ready to repeat the method.

2. The method of claim 1, wherein said support surface is substantially planar.

3. The method of claim 1, wherein said support surface is substantially unyielding.

4. The method of claim 1, wherein pressure on said support surface by said roller is controlled.

5. The method of claim 1, wherein said roller is reciprocated across the support surface.

6. The method of claim 1, wherein said web is flexible.

7. The method of claim 1, wherein said web supports an applied adhesive.

8. The method of claim 1, wherein said web is held stationary at one end.

9. The method of claim 1, wherein said web extends around said roller.

10. The method of claim 1, wherein movement of said web is restricted to movement at one end.

11. An apparatus for applying flexible indicia having a first adhesive on one side thereof and a carrier release sheet over said first adhesive to a receiving substrate in registry therewith, said apparatus comprising:

- a frame,
- a support surface attached to the frame,
- a roll of web material with a second adhesive on at least one side thereof, said second adhesive having a greater adhesive grip between said web material and said flexible indicia than an adhesive grip between said flexible indicia and said carrier release sheet, and
- said web material being supported with an end portion thereof being drawn over said support surface and then pressed in contact with the flexible indicia thereon, the second adhesive on said web material facing said support surface so that the flexible indicia can be placed on said support surface with the carrier release sheet in contact with said support surface, said web material being movable over said support surface and said flexible indicia adhered to said web material, said web material being drawn away from said support surface with said flexible indicia thereon, with the cover release sheet removed, and with said fist adhesive exposed, a receiving substrate being placed on said support surface, the receiving substrate having an adhesive bond with said first adhesive that is greater than a bond between said web material and said flexible indicia, said web material being moved over said support surface again under pressure and tension by a connection of the end portion to the continuous roll, and the flexible indicia being pressed against said receiving substrate with said first adhesive adhering said flexible indicia to said receiving substrate.

12. The apparatus as defined in claim 11, wherein said support surface is a light table with registry markings thereon.

13. The apparatus as defined in claim 11, wherein said support surface includes a lockable roll support on said frame, a movable press roller on said frame for drawing said web material over and away from said support surface in a reciprocating pattern, and a tensioning device for tensioning said web material over said press roller.

* * * * *